H. L. LEILICH.
CORN POPPER.
APPLICATION FILED MAY 29, 1908.

901,302.

Patented Oct. 13, 1908.

WITNESSES:
D. C. Walter
Hazel B. Hiett

INVENTOR.
Henry L. Leilich,
By Owen & Owen,
His attys.

UNITED STATES PATENT OFFICE.

HENRY L. LEILICH, OF DELPHOS, OHIO, ASSIGNOR TO THE DELPHOS MANUFACTURING COMPANY, OF DELPHOS, OHIO, A CORPORATION OF OHIO.

CORN-POPPER.

No. 901,302.      Specification of Letters Patent.      Patented Oct. 13, 1908.

Application filed May 29, 1908. Serial No. 435,627.

*To all whom it may concern:*

Be it known that I, HENRY L. LEILICH, a citizen of the United States, and a resident of Delphos, in the county of Allen and State of Ohio, have invented a certain new and useful Corn-Popper; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to corn-poppers of the sliding-lid or cover type; and it has for its object the provision, in combination with the lid or cover, of improved means for controlling the sliding movements thereof relative to the popper body or receptacle and which coöperates with the popper handle to maintain the lid or cover firmly in closed or open position.

Further objects of my invention are the provision in a popper lid or cover of openings of suitable size to enable the unpopped or imperfect kernels to be shaken through when the popper is inverted, and also of a perforated depression in which seasoning may be placed to enable it to enter the popper without opening the lid.

The invention is fully described in the following specification, and illustrated in the accompanying drawings, in which,—

Figure 1:
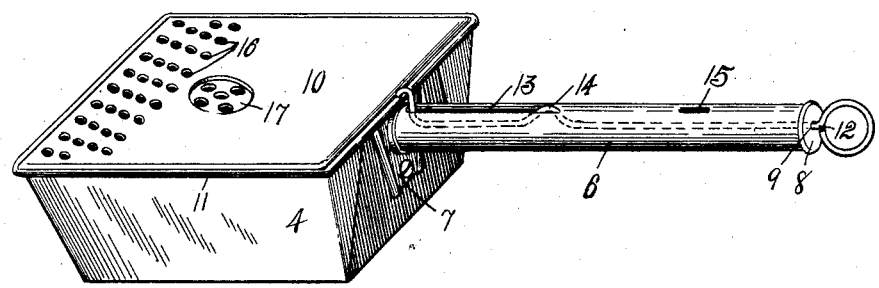
Figure 2:
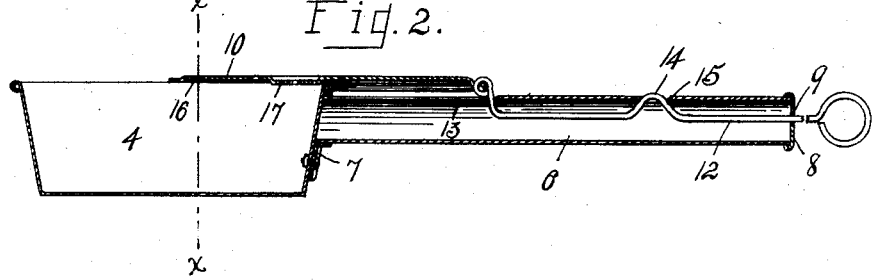
Figure 3:
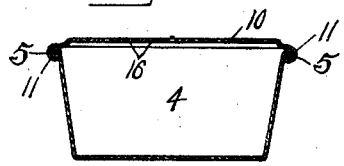

Figure 1 is a perspective view of a popper embodying the features of my invention with the lid or cover closed. Fig. 2 is a central longitudinal section thereof with the lid partly open, and Fig. 3 is a section on the line *x x* in Fig. 2.

Referring to the drawings, 4 designates a receptacle forming the popper body, which is rectangular in form and preferably constructed of sheet metal, the side walls and bottom being imperforate to adapt it to hold the seasoning material. The side walls of the receptacle are formed at their upper edges with outstanding beads 5, which may be rolled over a reinforcing wire or not, as desired. A handle 6 is secured to one end of the receptacle by means of a bracket 7, or in any other suitable manner, and is formed of sheet metal bent preferably into tubular form, and provided at its outer end with a cap 8 having a perforation 9 therethrough.

A lid or cover 10, preferably of sheet-metal, is slidingly mounted on the receptacle, and is constrained for movement longitudinally thereof due to its side edges being bent downwardly and inwardly to form flanges 11 which embrace the beads 5 of the side walls. The lid or cover has its movements controlled by a rod 12, which is disposed within the hollow of the handle 6 with its outer end working through the perforation 9 in the cap 8 and bent without the handle to form a finger grip, and its inner end bent upwardly through a longitudinally extending slot 13 in the handle top and engaged to the contiguous lid end, as by being looped through an eye therein as shown. The rod 12 is formed within the handle with a crimp or offset 14, which serves as a spring detent for automatically seating within a notch 15 in the handle top to yieldingly maintain the lid open when in such position, and also seating within the outer end portion of the slot 13 in the handle to yieldingly maintain the lid closed when in that position, said slot 13 being made of suitable length for such purpose.

A portion of the lid 10, preferably the forward end thereof, is provided with a plurality of openings or perforations 16, which are of suitable size to permit unpopped or imperfect kernels, chaff, or the like, to pass therethrough when the receptacle is inverted and shaken, thus providing simple and efficient means for separating the unpopped from the popped kernels without necessitating an opening of the lid. The lid is also provided with a perforated depression 17 in which butter or other seasoning material may be placed and allowed to run into the receptacle as it melts and during the popping operation without opening the lid.

From the foregoing it is thought that the construction, operation and many advantages of the popper embodying my invention will be apparent to those skilled in the art without further description, and it will be understood that various changes in the size, shape, proportions and minor details of construction may be resorted to without departing from the spirit or sacrificing any of the advantages of the invention.

Having thus described my invention, what I claim as new and desire to secure by Letters Patent, is,—

1. In a popper, a receptacle having a hollow handle at one end, said handle being provided with longitudinally spaced openings, a cover slidingly mounted on the receptacle, and a rod attached to the cover and having a portion disposed within the hollow of the handle and formed with an offset adapted to coöperate with the openings in the handle to yieldingly maintain the cover in adjusted position.

2. In a popper, a receptacle having a hollow handle provided with spaced openings, a cover slidingly mounted on the receptacle, and a spring rod projecting beyond the outer end of the handle and having its inner end projected outwardly through one of said openings and engaging the cover, said rod being crimped within the handle to form a spring detent which coöperates with said openings to normally retain the cover in adjusted position.

In testimony whereof I have hereunto signed my name to this specification in the presence of two subscribing witnesses.

HENRY L. LEILICH.

Witnesses:
FRANK X. STALLKAMP,
JOHN F. KRIEFT.